March 2, 1926.
J. L. SMITH
1,575,184
APPARATUS FOR REMOVING FLAWS AND SLIVERS FROM WORN RAILS
Filed Oct. 16, 1924     10 Sheets-Sheet 1
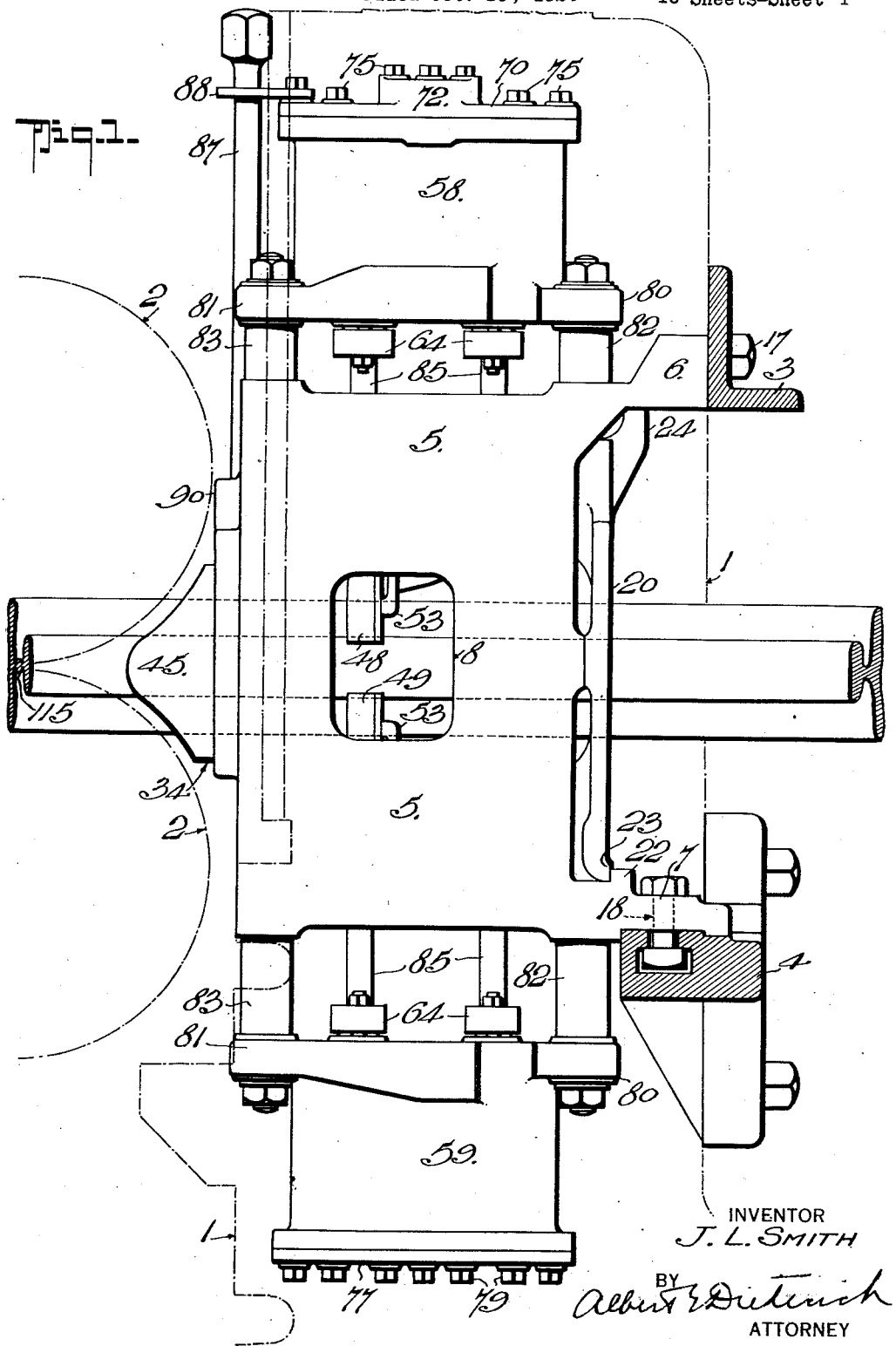
INVENTOR
J. L. SMITH
BY
Albert E Dietrich
ATTORNEY March 2, 1926.
J. L. SMITH
1,575,184
APPARATUS FOR REMOVING FLAWS AND SLIVERS FROM WORN RAILS
Filed Oct. 16, 1924 10 Sheets-Sheet 2
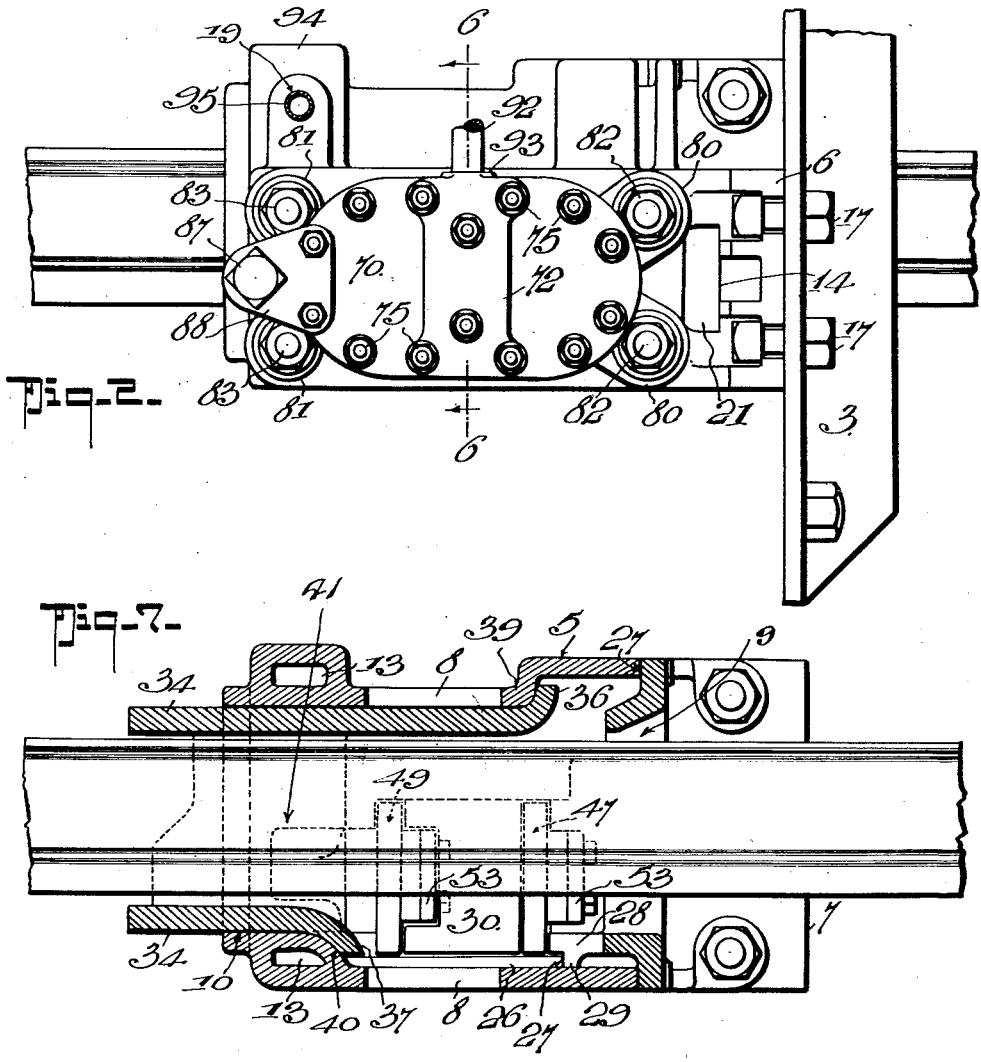
INVENTOR
J. L. SMITH
BY
Albert E. Dietrich
ATTORNEYS

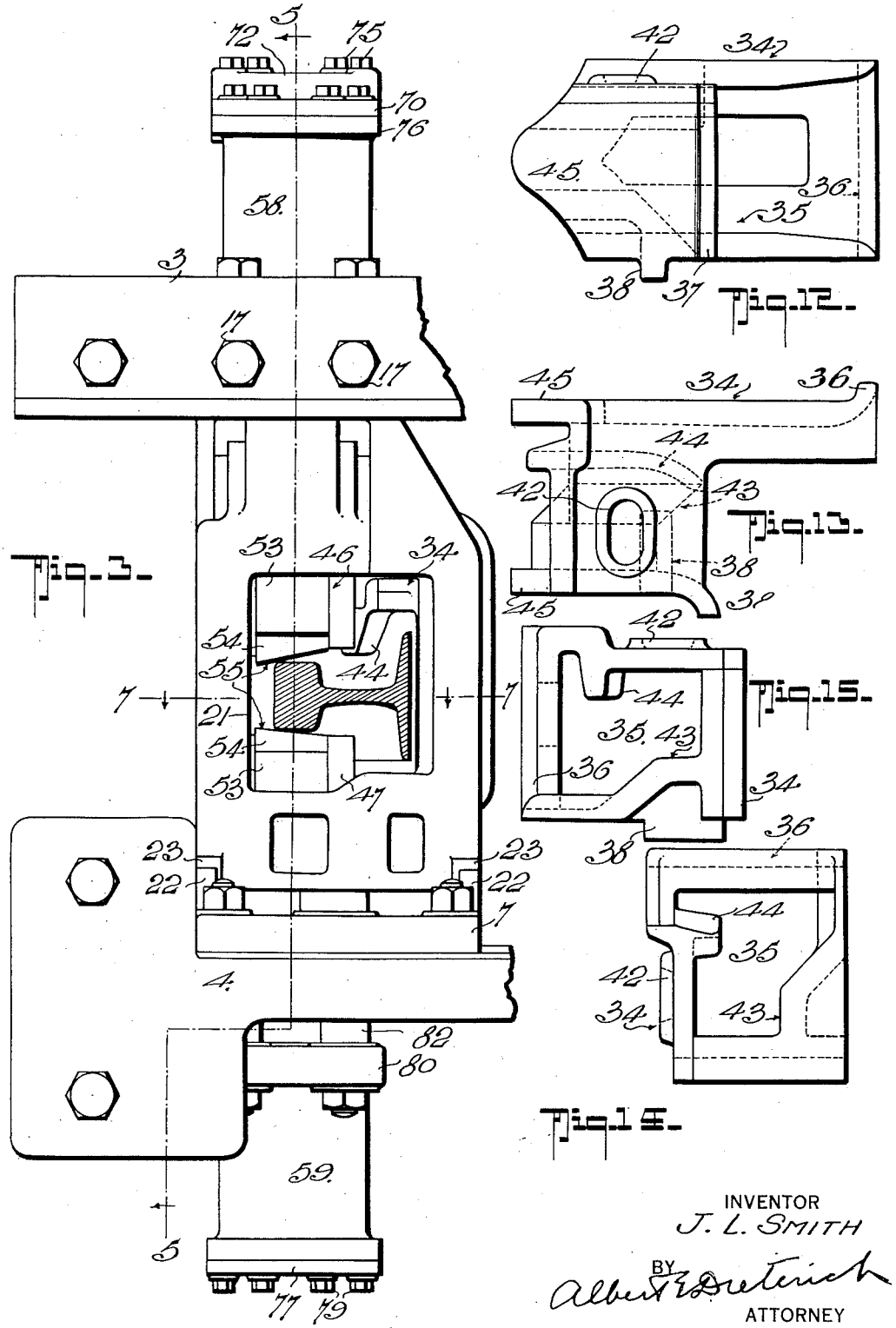

March 2, 1926. 1,575,184
J. L. SMITH
APPARATUS FOR REMOVING FLAWS AND SLIVERS FROM WORN RAILS
Filed Oct. 16, 1924 10 Sheets-Sheet 4
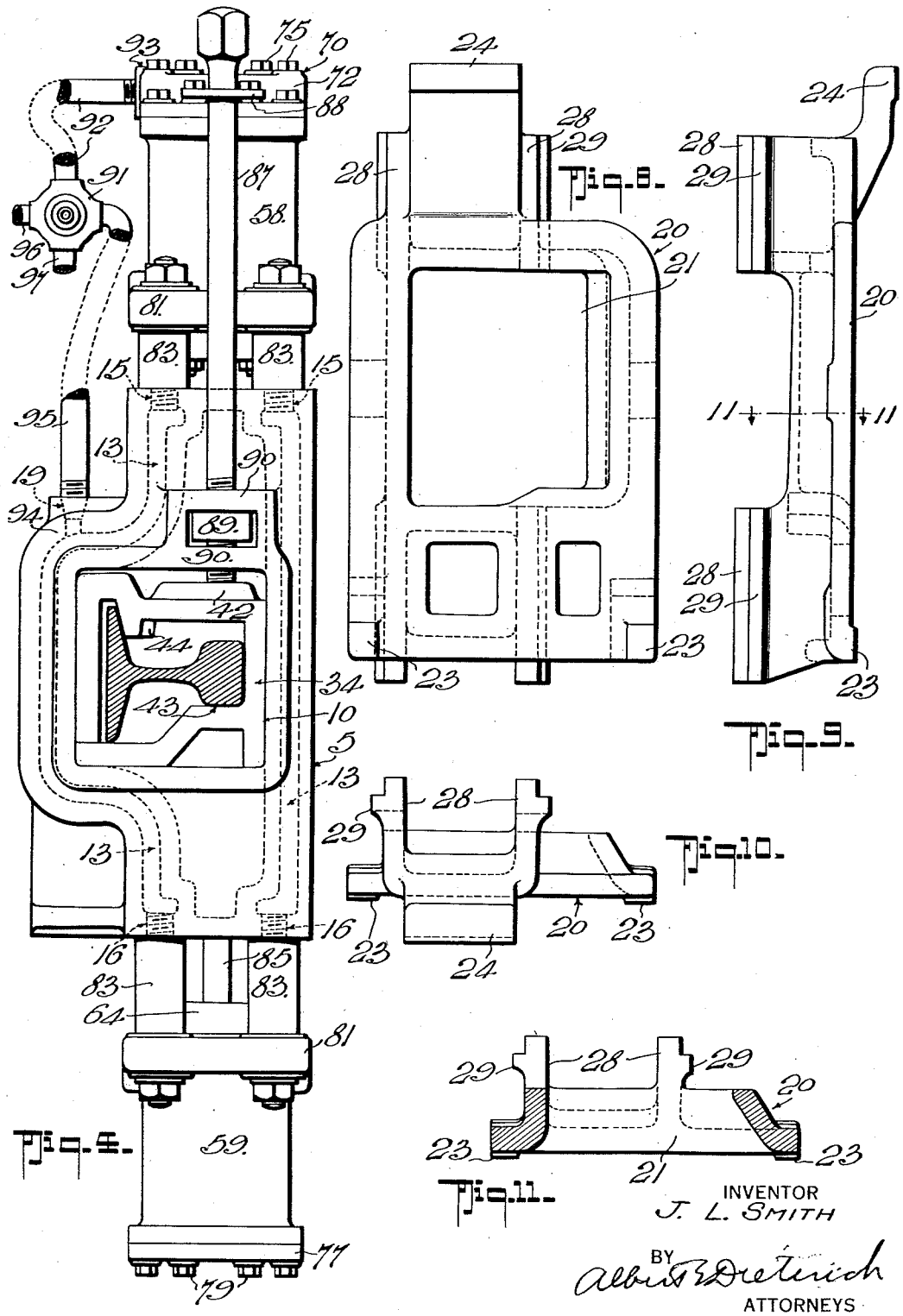

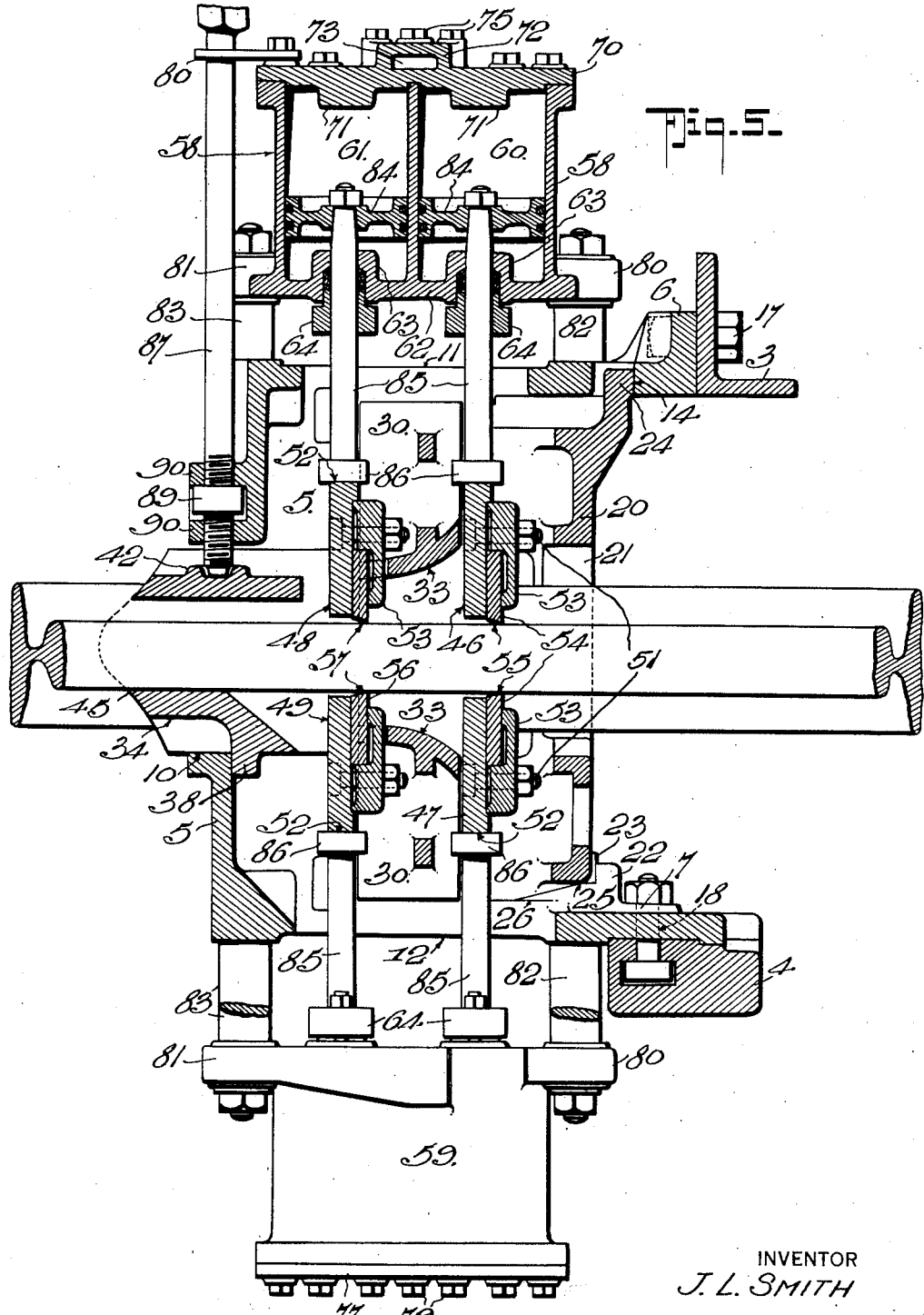

March 2, 1926.
J. L. SMITH
1,575,184
APPARATUS FOR REMOVING FLAWS AND SLIVERS FROM WORN RAILS
Filed Oct. 16, 1924    10 Sheets-Sheet 6
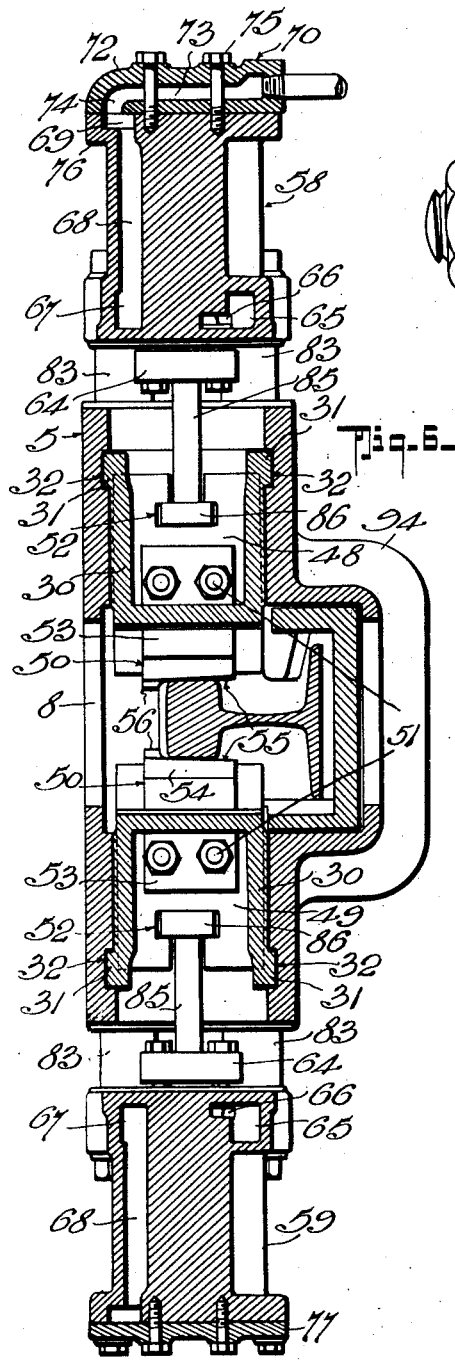
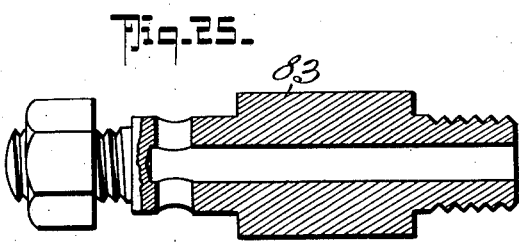
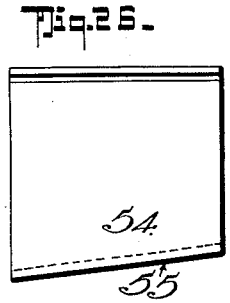
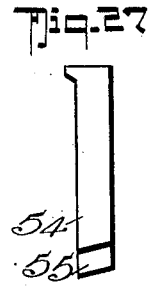
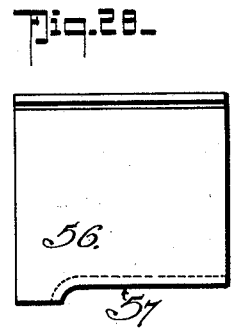
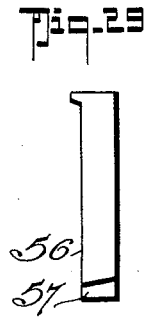
INVENTOR
J. L. SMITH
BY
Albert E Dietrich
ATTORNEY

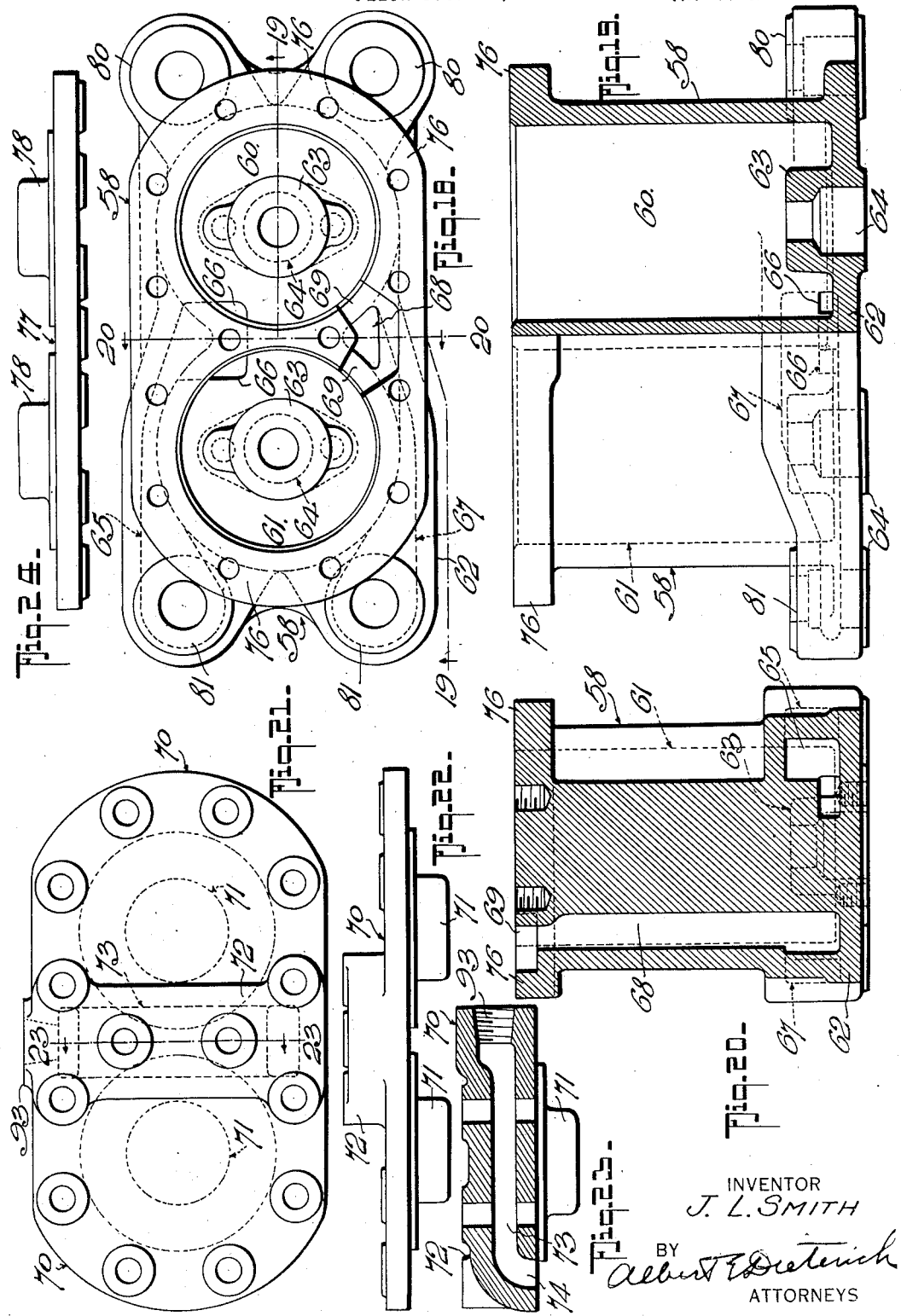

March 2, 1926.
J. L. SMITH
1,575,184
APPARATUS FOR REMOVING FLAWS AND SLIVERS FROM WORN RAILS
Filed Oct. 16, 1924    10 Sheets-Sheet 8
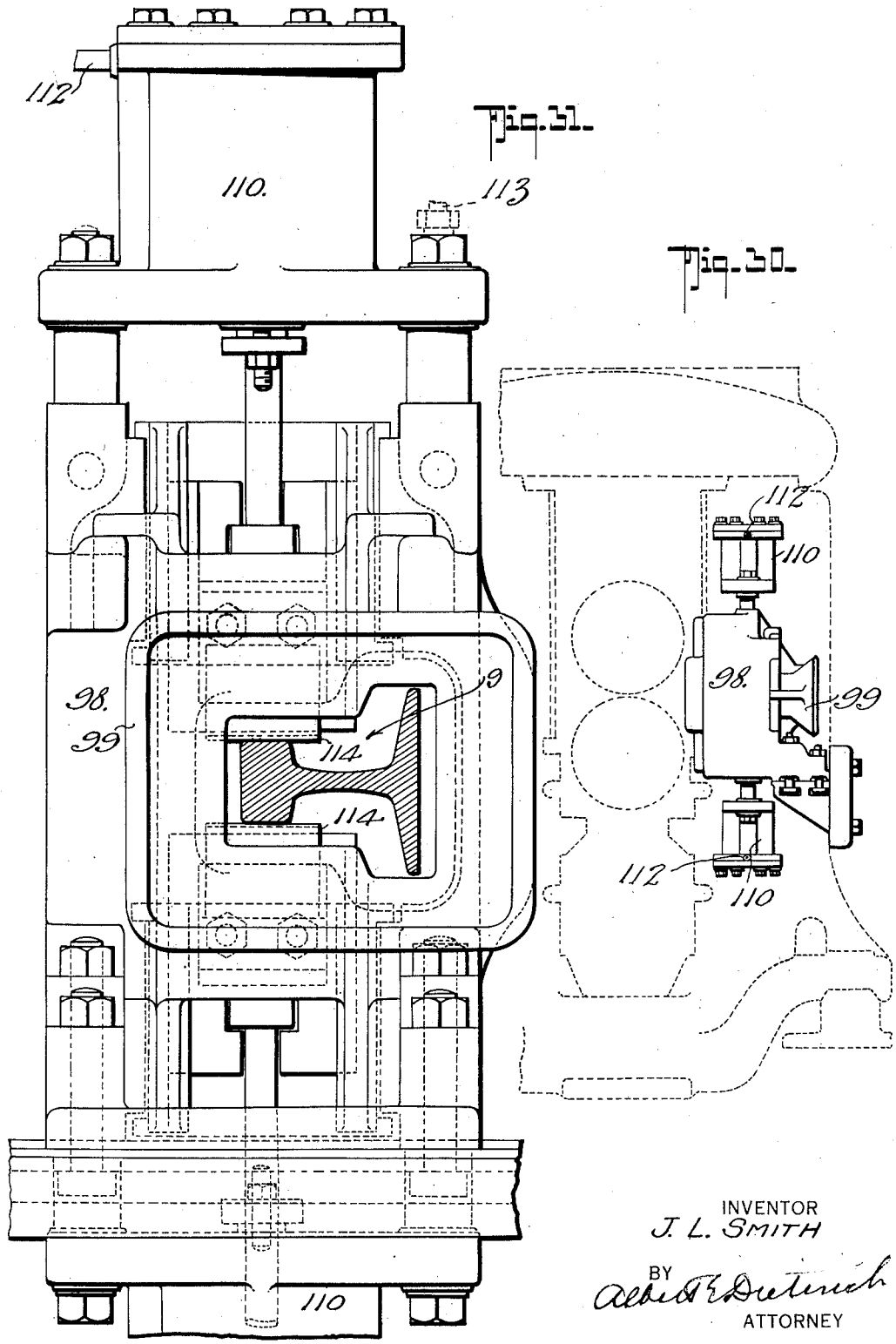
INVENTOR
J. L. SMITH
BY
ATTORNEY

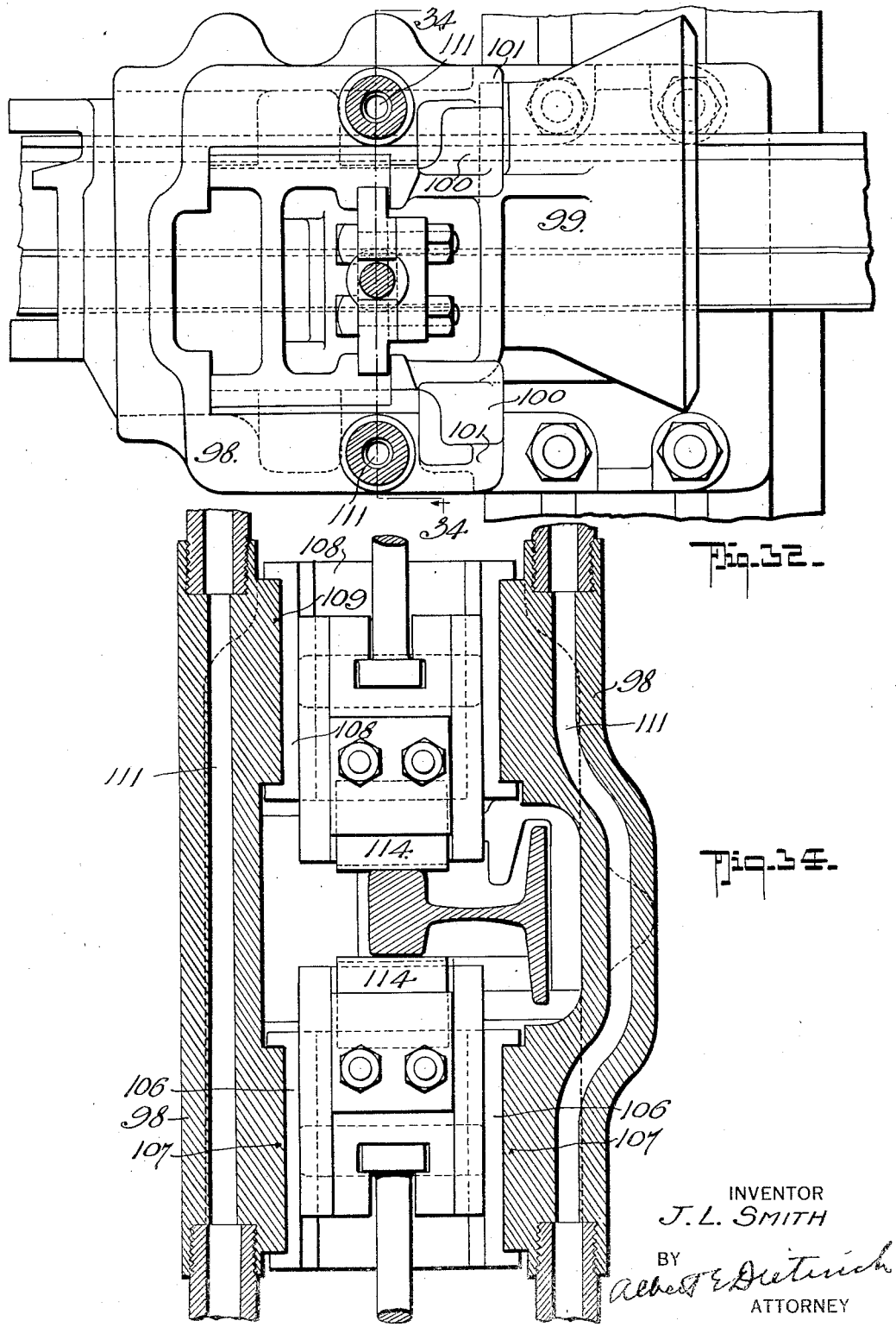

March 2, 1926.

J. L. SMITH 1,575,184

APPARATUS FOR REMOVING FLAWS AND SLIVERS FROM WORN RAILS

Filed Oct. 16, 1924  10 Sheets-Sheet 10

INVENTOR
J. L. SMITH
BY
Albert E Dieterich
ATTORNEY

Patented Mar. 2, 1926.

1,575,184

UNITED STATES PATENT OFFICE.

JOHN L. SMITH, OF HAMILTON, ONTARIO, CANADA, ASSIGNOR TO SHERIDAN A. SMITH, OF HAMILTON, ONTARIO, CANADA.

APPARATUS FOR REMOVING FLAWS AND SLIVERS FROM WORN RAILS.

Application filed October 16, 1924. Serial No. 744,057.

To all whom it may concern:

Be it known that I, JOHN L. SMITH, a citizen of the Dominion of Canada, residing at Hamilton, in the Province of Ontario, in the Dominion of Canada, have invented certain new and useful Improvements in Apparatus for Removing Flaws and Slivers from Worn Rails, of which the following is a specification.

My present invention relates to the art of metal working and particularly to the art of re-rolling worn rails on merchant mills into finished products such as rounds, squares, flats, etc. The flaws or slivers found on worn rails are caused by the flanges on the wheels of the locomotives and cars passing over them. After considerable wear these rails are discarded by the railroads because they no longer are fit for use; the discarded rails are then usually re-sold to mills and companies who use a percentage of these rejected rails to re-roll on merchant mills into the finished product above referred to. At the present time there is, to my knowledge, no machine in use that will remove these flaws and slivers while being re-rolled hot. There is a process in use where the slivers are planed off before the rails are heated, but this is a very expensive method and is not commercially satisfactory. If the flaws and slivers are not removed the head part, which is the heaviest part, is rejected, or if rolled into a finished product they cause a large percentage to be rejected because of imperfections.

My invention therefore has for its primary object to provide an apparatus that may be attached to the mill on the rest bars that extend across the housing that contains the rolls, said apparatus being provided with the necessary mechanism for the removal of the flaws and slivers from the head of the rail; another object is to provide such apparatus as will be inexpensive to produce and will readily and effectively cooperate with the rolling mill in such manner as to avoid the necessity of scraping any material part of the rail being re-rolled.

Another object of the invention is to provide apparatus which employ scraper knives to engage the rail heads and cylinder and piston devices to work the knives in such a manner that when a rail leaves the furnace and enters the rolls a valve is thrown allowing the air to enter the cylinders and operate on the pistons for the purpose of bringing the knives in contact with the defective parts of the rail to remove the flaws and slivers as the rail is being pulled through the machine by the rolls themselves and thereby make it possible to work successfully all the heads of the rails even when they are full of flaws and slivers caused by the wear of the locomotive and car wheels.

In its general nature the invention comprises a housing adapted to be secured to the rest bars of the mill housing in alignment with the pass entrance thereof and containing, in a removable manner, a bell mouth, a guide, spacers and scraper knives; the housing carries the cylinders whose pistons have their rods connected with the knives and operated by compressed air or other suitable medium in advance and withdraw the knives at proper times; there being in the preferred embodiment of the invention upper and lower knives with their cylinders and pistons, the air ducts of which cylinders unite through air duct passages in the housing whereby a single duct connecting the advancing and retracting ports of one cylinder with the control valve is sufficient to operate both sets of pistons.

More specifically the invention also resides in those novel features of construction, combination and arrangement of parts, all of which will be first fully described, and then be specifically pointed out in the appended claims, reference being had to the accompanying drawings, in which:—

Figure 1 is a side elevation of a preferred embodiment of the invention, a portion of the rolling mill and rolls being indicated in dot and dash lines, the rest bars being shown in full lines.

Figure 2 is a top plan view of the mechanism shown in Figure 1.

Figure 3 is a front elevation of the parts shown in Figure 1.

Figure 4 is a rear elevation of the invention per se.

Figure 5 is a central vertical longitudinal section taken substantially on the line 5—5 of Figure 3 and looking in the direction of the arrow.

Figure 6 is a cross section taken substantially on the line 6—6 of Figure 2 looking in the direction of the arrow.

Figure 7 is a horizontal section on substantially the line 7—7 of Figure 3 looking in the direction of the arrow, the rail being omitted.

Figure 8 is a front elevation of the bell mouth.

Figure 9 is a side elevation of the same.

Figure 10 is a top plan view thereof.

Figure 11 is a horizontal section on the line 11—11 of Figure 9 looking in the direction of the arrow.

Figure 12 is a detail side elevation of the rail guide.

Figure 13 is a plan view of the same.

Figure 14 is a front elevation of the same.

Figure 15 is a rear elevation of the same.

Figure 16 is a front elevation of one of the spacers.

Figure 17 is a side elevation of the same.

Figure 18 is a plan view of one of the cylinders with the head removed.

Figure 19 is a part central vertical longitudinal section and part side elevation on the line 19—19 of Figure 18.

Figure 20 is a cross section on the line 20—20 of Figure 18 looking in the direction of the arrow.

Figure 21 is a plan view of the upper cylinder head.

Figure 22 is a side elevation of the same.

Figure 23 is a cross section on the line 23—23 of Figure 21 in the direction of the arrow.

Figure 24 is a side elevation of the lower cylinder head.

Figure 25 is a detail vertical section of one of the cylinder studs showing the air passages in the same.

Figure 26 is a detail front elevation of one of the front knives.

Figure 27 is an end view of the same.

Figure 28 is a detail front elevation of one of the rear knives.

Figure 29 is an end elevation of the same.

Figure 30 is a side elevation of a modified form of the invention.

Figure 31 is an enlarged front elevation thereof.

Figure 32 is a plan view of the same.

Figure 34 is a vertical cross section on the line 34—34 of Figure 32 looking in the direction of the arrow.

Figure 33:
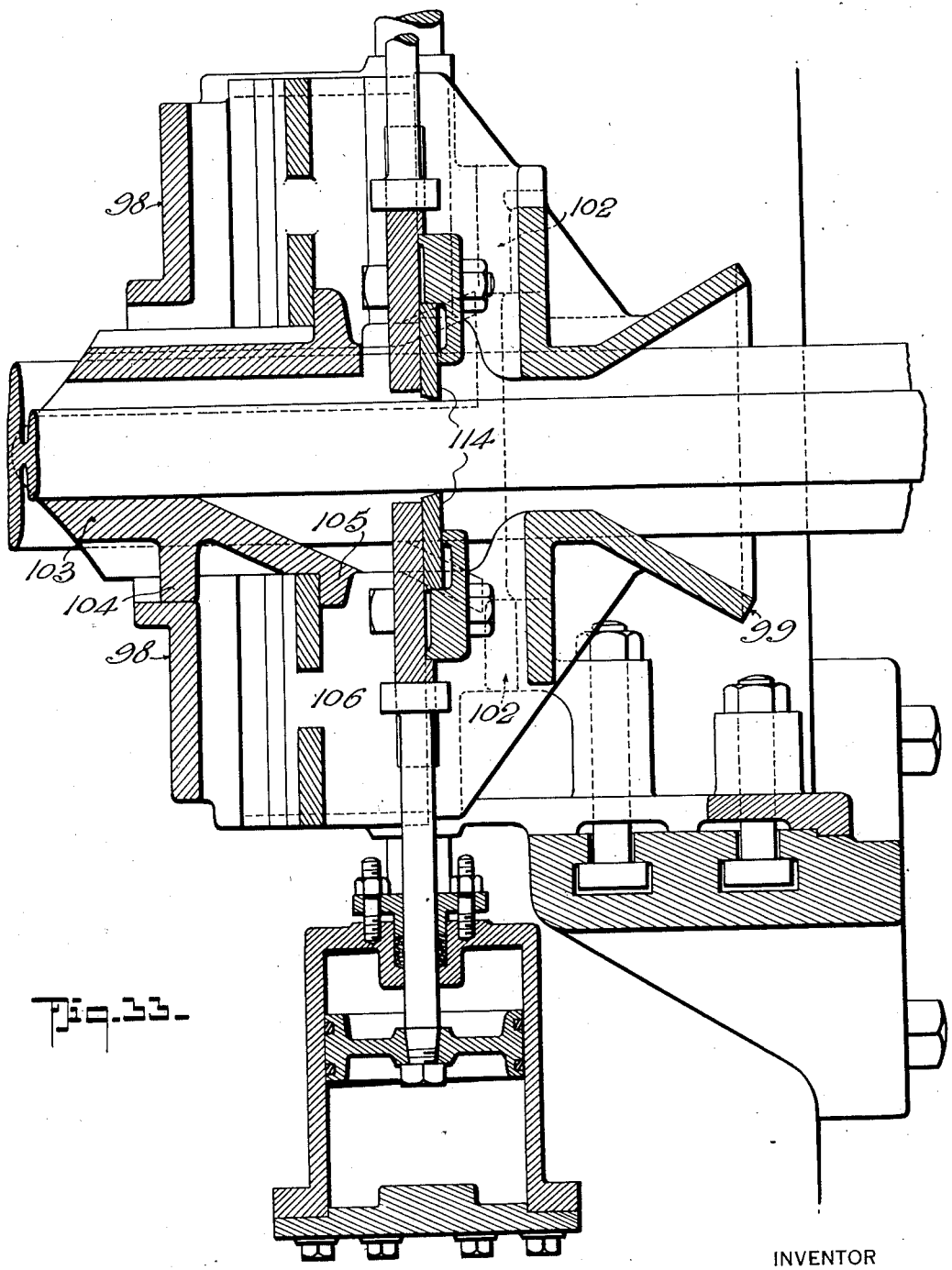
Figure 33 is a central vertical longitudinal section of a portion of the invention.

In the drawings in which like numerals of reference indicate like parts in all the figures, 1 is the rolling mill having the usual rolls 2 and rest bars 3 and 4, the construction of all of which may be of any well-known type and per se constitutes no part of the present invention.

5 represents the housing of the apparatus constituting my invention, this housing having an upper flange 6 by which it is bolted to the upper rest bar 3, and a lower flange 7 by which it is bolted to the rest bar 4. The housing 5 has side windows 8 in order that the work may be viewd by the attendant as it passes through the apparatus. 9 (see Figures 7 and 31) is the front opening and 10 the rear opening of the housing forming the pass through which the rails are drawn by the rolls 2 of the mill 1.

The housing is also provided with a top opening 11 and a bottom opening 12 and it is cast with air passes 13 on each side, the purpose of which will later appear. The flange 6 of the housing is provided with an opening 14 and the housing is also bored and tapped at 15 and 16 for the upper and lower cylinder supporting studs. The upper flange 6 is provided with bolt studs 17 and the lower flange 7 is provided with bolt holes 18 as indicated.

19 is a pipe tap to which the air duct 95 is connected, this tap being made in the lateral projection 94 of the housing. 20 designates the bell mouth which has the pass 21 through which the rails are drawn.

The housing 5 has lugs 22 that cooperate with the front abutment lugs 23 in the bottom of the bell mouth 20. The bell mouth also has a front abutment lug 24 at the top which projects into the opening 14 of the housing and abuts the front wall thereof, as best indicated in Figure 5 of the drawings. 25 is a rest on the housing 5 on which the lower extremity of the bell mouth sets and the housing 5 has bell mouth rest flanges 26, best shown in Figure 5 of the drawings.

The housing 5 has stop shoulders 27 for the bell mouth and the bell mouth is provided with spacing wings 28 having shoulders 29 as clearly indicated in Figures 9 and 10 of the drawings. The shoulders 29 engage stop shoulders 27 hereinbefore referred to.

30 designates the spacers of which there are two, a top and a bottom one. These spacers are of the same construction and include the supporting flanges 31 for the guideways 32 of the housing and the spacers have convex surfaces 33, that of the upper spacer opposing that of the lower spacer to assist in guiding the rail through the pass between the spacers.

34 is the guide which guides the rail through between the scrapers, the construction of this guide is best illustrated in Figures 12 to 15 inclusive of the drawings, by reference to which it will be seen that the guide has a pass 35 lengthwise through it. It also has front stop lugs 36 at one side and rear stop lugs 37 at the other side, a bottom stop lug 38 being also provided. The housing 5 has shoulders 39 to cooperate with a stop lug or projection 36 and a second shoulder 40 to cooperate with the stop lug or projection 37. The housing also has a groove 41 (see Figure 7) to receive the stop lug 38.

On its top and rear portion the guide has a recess 42 for the reception of the end of the securing bolt 87, later again referred to. 43 is the rail head support of the guide and 44 the rail base top support. 45 designates the rear side guide wings of the guide which are best shown in Figures 12 and 13 of the drawings.

In the embodiment of the invention being described two sets of knives are used, a front set and a back set, each comprising an upper and lower knife and their actuating mechanisms. 46 designates the upper front knife holder while 47 indicates the lower front knife holder; 48 indicates the upper rear knife holder and 49 the lower rear knife holder. Each knife holder is of the same construction so a description of one will be sufficient. The knife holder has blade receiving recesses 50 and holes for bolts 51 and T-slots 52, the latter being provided for the piston rod's connection. 53 indicates the blade clamps which are bolted to the knife holders to hold the knives or blades in place. 54 indicates the front right and left knives or blades which have inclined lower cutting edges 55; 56 represents the rear knives or blades (right and left) which have horizontal cutting edges 57.

58 designates the upper cylinder and 59 the lower cylinder, each of which has a front piston chamber 60 and a rear piston chamber 61, and each of which has a base flange 62 with piston rod guides 63 and glands 64 as indicated. Each cylinder has its pass cored to provide a passage 65 that unites with ports 66 into the piston chambers 60 and 61 respectively, and a cored passage 67 that unites with a duct 68 leading to the head of the cylinder. The cylinder has ports 69 which lead from the duct 68 into the head ends of the cylinders.

The heads of the upper and lower cylinders are somewhat different. 70 indicates the head of the upper cylinder which is provided with piston stops 71 and which has a raised portion 72 having a passage 73 in the raised portion 72. 74 is a port between the passage 72 and duct 68. The cylinder head is secured to the cylinders by studs and nuts 75 in a detachable manner, the cylinders being provided with a flange 76 for the head 7.

77 is the cap for the lower cylinder and this is also provided with piston stops 78 and is fastened to the cylinder by studs and nuts 79 in a manner similar to that of the fastening of the upper cylinder head. The lower cylinder head, however, is not cored or provided with any passages.

80 indicates the front mounting ears of the cylinder pass and 81 designates the rear mounting ears. 82 are the front cylinders mounting studs and 83 are the rear cylinder mounting studs, the latter being cored or provided with bored air passages as best shown in Figure 25 of the drawings for effecting communication between the respective passages 67 and 65 and 13—13 for a purpose presently understood. Pistons 84 have their rods 85 passed through the guides 63 and have T-heads 86 to fit within the T-slots 52 of the knife holders.

The guide 34 is held down in place in the housing by the engagements of the several lugs of the guide with the opposing ones of the housing, and having a bolt 87 which passes through a lug 88 and through the ears 90, between which is located a nut 89 on the bolt, the lower end of the bolt resting in the recess 42 of the guide.

91 is a four-way control valve from which a duct 92 leads to the port 93 in the raised portions 72 of the upper cylinder head. The tap 19 in the lateral projection 24 is connected by a duct 95 with the control valve 91. 96 designates the air supply duct from a suitable source to the valve 91 and 97 is the exhaust duct to atmosphere.

In using this embodiment of my invention a rail coming from the furnace is passed through the bell mouth and guide to the rolls of the mill and by them is drawn along. As the rail enters the rolls the valve 91 is moved to a position which will cause the air from the source to flow via ducts 96 and 92 to the tap 93 and pass through the the passages 73 to the duct 68 and through ports 69 of the upper cylinder into the cylinder chambers 60 and 61 of the upper cylinder to force the upper pistons downwardly; the air also passes down duct 68 of the upper cylinder through passages 67, one of the passages 13 in register with the passage 67 via the drilled or cored stud 83 to the similar passage 67 of the lower cylinder, down the duct 68 thereof, through port 69 of that cylinder and into the lower cylinder chambers 60 and 61 at the bottom to force the pistons upwardly. At the same time the air on the inner sides of the pistons is exhausted through ports 66, ducts 65, the connecting duct 13, duct 95, valve 91 to atmosphere via duct 97. This action brings the scraper blades or knives into engagement with the head of the rail as it is being drawn through the apparatus by the mill rolls, thereby removing all scale and flaws. After the rail has passed through the apparatus the valve 91 is shifted to bring the ducts 95, 96, 92—92 into communication, thereby reversing the movement of the pistons and bringing the knives clear of the next rail which enters the pass. This completes the cycle of operation.

In Figures 30 et seq. I have illustrated a modification of my invention in which but a single set of knives is employed, i. e., one knife only, top and bottom, and a single piston and cylinder at the top and at the bottom for operating those knives. By reference to these figures it will be noted that 98 indicates the housing, 99 the bell mouth, 100 the bell mouth rest lugs, which lie on the rest lugs 101 of the housing. The bell mouth 99 is provided with holding lugs 102 at the top and bottom as shown.

In this embodiment of the invention the guide is indicated at 103 and its supporting lugs by 104, while the holding lugs are indicated by 105. 106 is the lower spacer and 107 the lower spacer rest flange. 108 is the upper spacer and 109 its rest flange. The cylinders are indicated 110 and the air ducts in the housing which effect communication between the upper and lower cylinder are indicated by 111, and the ducts which connect the control valve with the apparatus are indicated by 112 and 113 respectively.

The operation of the modified embodiment of my invention is essentially the same as that of the preferred embodiment, to wit: As the rail enters the apparatus it is taken up by the rolls of the mill to pull it through the valve 91 which is adjusted to admit air into the cylinders in such way as to force the knives 114 into engagement with the head of the rail to be scraped and after the rail has passed the valve 91 can be set to retract the knives as before.

With but slight modifications in the shape of the passes and in the outline of the cutting edge of the knives, the invention may be readily adapted for scraping surface defects from sheet bars etc. as will be quite evident to those skilled in the art and as such changes would involve mere mechanical elements of design, illustration and description thereof herein is thought to be unnecessary.

115 indicates how the rolls roll the rail to sever the head and base from the web, it being understood that there is a pass turned in the rolls that cuts the rail in three sections, i. e. separates the head, the flange or base and the web.

From the foregoing description, taken in connection with the accompanying drawings, it is thought the complete construction, operation and advantages of my invention will be clear to those skilled in the art.

What I claim is:

1. In apparatus of the kind described, a housing having a pass through the same, upper and lower cylinders with piston and piston rods mounted on said housing, a guide removably mounted in said pass and itself having a pass with article supporting surfaces, at least one set of knife holders with knives to engage the article to be scraped and to which holders said rods connect, at least one set of scrapers mounted in said housing pass, a bell mouth mounted in said housing at the front of the same and being associated with said spacers to comprise knife holder slideways, and means to admit fluid to said cylinders for operating said pistons.

2. In apparatus of the kind described, a housing having a pass through the same, upper and lower cylinders with piston and piston rods mounted on said housing, a guide removably mounted in said pass and itself having a pass with article supporting surfaces, at least one set of knife holders with knives to engage the article to be scraped and to which holders said rods connect, at least one set of scrapers mounted in said housing pass, a bell mouth mounted in said housing at the front of the same and being associated with said spacers to comprise knife holder slideways, said guide having a top and a bottom open portion to permit said knife holder to project into the pass thereof, and means to admit fluid to said cylinder to operate said pistons.

3. An apparatus of the kind described, a housing, means for mounting the same on a rolling mill, said housing having a pass for the article being rolled, and having front and back side stop shoulders and a rear stop portion, a guide held within said pass and having side stop portions to engage with said shoulders and having a bottom lug to engage with said rear stop portion, said guide having a pass, a bell mouth located at the front of the housing, said housing and said bell mouth having portions of each abutting to sustain said bell mouth in place, an upper and a lower knife holder located in said pass, an upper and a lower spacer mounted in said housing, said spacers and said bell mouth having portions located in opposition and constituting vertical guide channels for said knife holders, and means for advancing and retracting said knife holders.

4. In apparatus of the class described wherein is provided a housing, a pass, and opposing scrapers located within the housing; means to operate said scrapers, said means comprising a pair of cylinders mounted on the housing, one for each scraper, a piston within each cylinder, piston rods connecting the respective pistons and scrapers, means to admit and exhaust fluid to and from said cylinders, said means including ducts in the housing between the respective cylinders, a control valve, and ducts between said valve and said cylinders, substantially as shown and described.

5. In apparatus of the class described, the combination with a rolling mill having rest bars; a rail head scraping apparatus associated with said mill whereby the mill rolls draw the rail through said apparatus, said apparatus comprising a housing, means to secure said housing to the rest bars of the mill, said housing having a rail pass, a guide held in said pass and having a portion projected out of the rear of said housing and a portion projecting to adjacent the front thereof, two sets of upper and lower knife holders projected into the guide, a bell mouth held on said housing at the front thereof and having a pass and spaced upper and lower pairs of spacer wings abutting said knife holders, sets of upper and lower spacers also abutting said knife holders above and below said guide, said spacers and said bell mouth being associated with said housing to constitute knife holder slideways, means sustaining said spacers and bell mouth in position and means to move said knife holders to advance or retract the same.

6. In apparatus of the class described, the combination with a rolling mill having rest bars; a rail head scraping apparatus associated with said mill whereby the mill rolls draw the rail through said apparatus, said apparatus comprising a housing, means to secure said housing to the rest bars of the mill, said housing having a rail pass, a guide held in said pass and having a portion projected out of the rear of said housing and a portion projecting to adjacent the front thereof, two sets of upper and lower knife holders projected into the guide, a bell mouth held on said housing at the front thereof and having a pass and spaced upper and lower pairs of spacer wings abutting said knife holders, sets of upper and lower spacers also abutting said knife holders above and below said guide, said spacers and said bell mouth being associated with said housing to constitute knife holder slideways, an upper and a lower cylinder mounted on the housing and each having a pair of piston chambers, pistons in said chambers, rods on said pistons projecting out of the cylinders and carrying said knife holders to effect the operation of the same.

7. In apparatus of the class described, the combination with a rolling mill having rest bars; a rail head scraping apparatus associated with said mill whereby the mill rolls draw the rail through said apparatus, said apparatus comprising a housing, means to secure said housing to the rest bars of the mill, said housing having a rail pass, a guide held in said pass and having a portion projected out of the rear of said housing and a portion projecting to adjacent the front thereof, two sets of upper and lower knife holders projected into the guide, a bell mouth held on said housing at the front thereof, and having a pass and spaced upper and lower pairs of spacer wings abutting said knife holders, sets of upper and lower spacers also abutting said knife holders above and below said guide, said spacers and said bell mouth being associated with said housing to constitute knife holder slideways, an upper and a lower cylinder mounted on the housing and each having a pair of piston chambers, pistons in said chambers, rods on said pistons projecting out of the cylinders and carrying said knife holders to effect the operation of the same, each of said cylinders having a pair of air passages, one of which connects with ports at the inner ends of the piston chambers, the other extends to the outer ends of the piston chambers and connects with ports thereat, heads for said cylinders, one of said heads having an enlargement provided with an air duct, an air inlet port and a port to said other duct, said housing having a pair of ducts for connecting the air passages of the upper and lower cylinders to effect a simultaneous action of both sets of pistons and having an air port, and means admitting and exhausting air via said air ports to move said pistons.

8. In apparatus of the class described, a housing having a pass, a guide insertable bodily in the pass and itself having a pass shaped to provide rest surfaces for the passing article to be scraped, said housing having a bolt hole and nut recess, a bolt and nut mounted in the same, said guide having a socket to receive an end of said bolt whereby said bolt will exert clamping pressure to hold said guide secure, said housing and said guide having abutting stops to prevent displacement of the guide in the direction of travel of the article being operated on, scrapers and scraper operating guides carried by the housing for the purpose specified.

9. In apparatus of the class described, a housing having a pass, a guide insertable bodily in the pass and itself having a pass shaped to provide rest surfaces for the passing article to be scraped, said housing having a bolt hole and nut recess, a bolt and nut mounted in the same, said guide having a socket to receive an end of said bolt whereby said bolt will exert clamping pressure to hold said guide secure, said housing and said guide having abutting stops to prevent displacement of the guide in the direction of travel of the article being operated on, said housing having side walls with upper and lower horizontal spacer guideways, spacers mounted in said guideways above and below said guide, knife holders held with said housing, means to operate said holders for causing their knives to fuction, a bell mouth held in said housing and having members to oppose the adjacent spacers and provide, with them, vertical slideways for said knife holders.

10. In apparatus of the class described, a housing having a pass, a guide insertable bodily in the pass and itself having a pass shaped to provide rest surfaces for the passing article to be scraped, said housing having a bolt hole and nut recess, a bolt and nut mounted in the same, said guide having a socket to receive an end of said bolt whereby said bolt will exert clamping pressure to hold said guide secure, said housing and said guide having abutting stops to prevent displacement of the guide in the direction of travel of the article being operated on, said housing having side walls with upper and lower horizontal spacer guideways, spacers mounted in said guideways, above and below said guide, knife holders held within said housing, means to operate said holders for causing their knives to function, a bell mouth held in said housing and having members to oppose the adjacent spacers and provide, with them, vertical slideways for said knife holders, said spacers being insertable through the entrance end of the housing pass and said bell mouth serving to retain said spacers and said knife holders against movement in the direction opposite to that of the movement of the article being operated on.

11. In combination with a housing, having a passage through the same, a work guide located in and bodily removable from the housing through one end of the passage, said work guide having a pass shaped to permit passage therethrough of the article being operated on, knife holders, means for mounting said holders in said housing to project into the pass of said guide and operate on the work, and mechanism mounted on the housing to operate said knife holders.

12. In combination with a housing, having a passage through the same, a work guide located in and bodily removable from the housing through one end of the passage, said work guide having a pass shaped to permit passage therethrough of the article being operated on, knife holders, means for mounting said holders on said housing to project into the pass of said guide and operate on the work, and mechanism mounted on the housing to operate said knife holders, said means for mounting the holders including a bell mouth held in the housing and having spacing wings and spacers held in the housing and having portions opposed to said wings to constitute vertical slideways for the knife holders.

13. In the art of re-rolling worn rails, means for scraping the slivers and flaws from the rail while being rolled hot, and means for immediately thereafter severing the head and base from the web of the rail.

JOHN L. SMITH.